US006367988B1

(12) United States Patent
Auracher et al.

(10) Patent No.: US 6,367,988 B1
(45) Date of Patent: Apr. 9, 2002

(54) HERMETICALLY AND TIGHTLY SEALED OPTICAL TRANSMISSION MODULE

(75) Inventors: Franz Auracher, Baierbrunn; Hartmut Schneider, München, both of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/381,453
(22) PCT Filed: Mar. 18, 1998
(86) PCT No.: PCT/DE98/00798
§ 371 Date: Sep. 20, 1999
§ 102(e) Date: Sep. 20, 1999
(87) PCT Pub. No.: WO98/41888
PCT Pub. Date: Sep. 24, 1998

(30) Foreign Application Priority Data

Mar. 18, 1997 (DE) .......................... 197 11 283

(51) Int. Cl.$^7$ ................................. G02B 6/36
(52) U.S. Cl. ................... 385/88; 89/90; 89/91; 89/92; 89/93; 89/94
(58) Field of Search .................... 385/50, 51, 52, 385/88, 89, 92, 93, 94

(56) References Cited

U.S. PATENT DOCUMENTS

| | | | |
|---|---|---|---|
| 4,917,451 A | * | 4/1990 | Chouinard et al. ...... 350/96.14 |
| 5,127,075 A | * | 6/1992 | Althaus et al. ............. 385/94 |
| 5,315,680 A | * | 5/1994 | Musk et al. ................ 385/88 |
| 5,414,787 A | | 5/1995 | Kurata |
| 5,500,914 A | | 3/1996 | Foley et al. |
| 5,535,296 A | | 7/1996 | Uchida |
| 5,562,838 A | | 10/1996 | Wojnarowski et al. |
| 5,692,084 A | * | 11/1997 | Roff ........................ 385/88 |

OTHER PUBLICATIONS

Yano et al, "Optical Semiconductor Devices and Modules for Optical Parallel Link", *Fujitsu Sci. Tech. J.*, vol. 30, No. 2, pp. 195–202 (Dec. 1994).

Hanatani et al, "10 Channel Fully–Integrated High–Speed Optical Transmitter Module with a Through–put Larger Than 8 Gbit/s", *Proc. 21$^{st}$ Eur. Conf. on Opt. Comm.* (ECOC '95—Brussels), pp. 875–878.

Schneider, "Realization of SiO$_2$–B$_2$–TiO$_2$ Waveguides and Reflectors on Si Substrates", *Mat. Res. Soc. Symp. Proc.*, vol. 244, 1992 Materials Research Society, pp. 337–343.

Ambrosy et al, "Silicon Motherboards for Multichannel Optical Modules", *Proc. of 45$^{th}$ ECTC*, Las Vegas, May 1995, pp. 570–576.

* cited by examiner

Primary Examiner—Georgia Epps
Assistant Examiner—Tuyen Tra
(74) Attorney, Agent, or Firm—Schiff Hardin & Waite (57) ABSTRACT

The transmission module is composed of a housing that hermetically tightly surrounds a cavity containing a plurality of semiconductor lasers and comprises a plurality of optical connecting waveguides secured hermetically tight in the housing, each of which optically connecting a respective laser in the cavity to a respective fiber leading away from the outside of the housing.

19 Claims, 5 Drawing Sheets

HERMETICALLY AND TIGHTLY SEALED OPTICAL TRANSMISSION MODULE

BACKGROUND OF THE INVENTION

The invention is directed to a hermetically and tightly sealed optical transmission module having one or more semiconductor lasers arranged on a carrier body, an optical fiber for each laser leading away from the body with a hermetically tight optical connection on the body for each laser and the respective optical fiber.

A transmission module of said species is disclosed by M. Yano and K. Vakao, "Optical Semiconductor Devices and Modules for Optical Parallel Link," Fujitsu, Sci. Tech. J. 30, 2, pages 195–202 (December 1994). In this known module, the hermetically tight, optical connection between each semiconductor laser and the optical fiber optically connected thereto is comprised therein that the fiber is soldered into the carrier member and an end face of this soldered-in fiber lies immediately opposite a light exit window of the semiconductor laser.

The carrier member itself is composed of two body sections, the fibers being soldered into the one thereof and the semiconductor lasers being secured on the other. The two body halves are connected to one another such that the end face of a respective fiber is arranged opposite the light exit window of each semiconductor laser.

S. Hanatani et al, "10 Channel Fully-integrated High-Speed Optical Transmitter Module with a Through-put Larger Than 8 bits", Proc. 21st ECOC '95, Paper ThB.1.4, pages 875–878, discloses an optical transmission module, whereby a plurality of semiconductor lasers are arranged in a cavity of a housing, whereby each semiconductor laser is optically connected to an optical fiber leading away from the housing, being optically connected thereto by a planar micro-lens secured in the housing. A plurality of electrical connecting lines for producing an electrical connection between the cavity and the outside environment of the housing are also secured in the housing.

The housing is composed of a first housing section that comprises a sack-like recess defining the cavity in which all semiconductor lasers are arranged and in which electrical connecting lines are secured, and is composed of a second housing section in which the planar micro-lens to which the fibers are connected is secured.

For producing the optical connection between the semiconductor lasers and the fibers, the second housing section is plugged into an opening of the sack-like recess of the first housing section.

SUMMARY OF THE INVENTION

The invention has the advantage that a hermetically tight or sealed transmission module is offered that is fabrication-friendly to manufacture.

In particular, the inventive module has the advantage that an extremely fabrication-intensive metallization and soldering of fibers into a housing or a housing section is not required. A polishing as well as an anti-blooming of fibers secured in a housing are also advantageously eliminated. The risk of breakage of fibers that have been soldered in at the solder location advantageously does not exist.

Advantageously, the inventive module can be particularly utilized as a hermetically tight or sealed transmission module for parallel optical links that are gaining in significance in the immediate future as cost-beneficial and performance-capable transmission means for data rates of approximately 100 Mbit/s through 2.5 Gbit/s per channel and transmission distances from approximately 1 m up to approximately 10 km. The applied potential of such links extends from optical backplanes or, respectively, backplane wirings, for example for high-performance telecom switching systems via computer connections to LAN backbones and the subscriber terminal area.

Such links are essentially composed of the transmission module, which is usually composed of a laser line with suitable electrical inputs and optical outputs and a fiber ribbon cable as transmission medium, as well as of a receiver module having optical inputs and electrical outputs.

Dependent on the area of employment, different technologies, or, respectively, sub-components are thereby utilized, for example short-wave lasers such as VCSL or Fabry-Perot lasers and multimode fibers for short transmission distances or long-wave Fabry-Perot lasers or DFB lasers as well and monomode fibers for longer transmission distances and high data rates. The coupling of the fibers to the semiconductor lasers in the transmission module is thereby especially difficult and cost-intensive, particularly when monomode optical fibers are to be utilized and when a hermetically tight embodiment is required for dependability reasons.

The inventive module advantageously satisfies these demands.

In order to govern the adjustment tolerances better when coupling the semiconductor lasers to the monomode fibers and, thus, to govern the manufacturing costs similar to the known module of the species initially cited, a simple butt coupling is utilized in the inventive module and a spot matching realized, for example, by optical lenses between the semiconductor lasers and the fibers as standard in telecom modules for high data rates up to 10 Gbit/s and long transmission distances of, typically, at least 50 km is foregone.

The lower coupling efficiency of approximately −10 dB compared to, typically, −6 through −2 dB given spot matching that is involved with the butt coupling can be advantageously accepted because of the shorter transmission distances and, moreover, the lower coupling efficiency advantageously leads to lower reactance of reflections onto the semiconductor laser, this being important for data rates above 622 Mbit/s given transmission distances of several kilometers since, by contrast to the high-end telecom modules, no optical insulators are utilized. As a result of employing butt coupling, the problems involved with lenses, for example complicated manufacture and adjustment problems also do not occur.

A very particular advantage of the inventive module is to be seen therein that a hermetically tight module design that is otherwise especially difficult to realize is offered that can be realized in a relatively simple, fabrication-friendly and cost-beneficial way.

The inventive module differs from the known module with butt coupling of the species initially cited essentially in that the carrier member is composed of a housing that hermetically tightly surrounds a cavity in which the semiconductor laser or lasers are arranged; in that a hermetically tight optical connection between a semiconductor laser and an optical fiber is not realized, as in the known arrangement, by a hermetically tight fastening by soldering the fiber itself in the housing but is realized with a separate, optical connecting waveguide secured hermetically tight in the housing for producing an optical connection between the cavity and the outside environment of the housing; and in that a housing is realized with one or more electrical lines secured hermetically tight in the housing for producing an electrical connection between the cavity and the outside environment of the housing.

As a result of the inventive connecting waveguide, a difficult and complicated manipulation of the fiber end sections during metallization, soldering, polishing end faces and anti-blooming is illuminated, as is a risk of breakage of the fibers due to the solder locations.

Given the module of the second-sided document, the semiconductor lasers are in fact arranged in a cavity of a housing in which electrical connecting waveguides are secured for connecting the cavity and the outside environment of the housing; however, the fibers are not connected by inventive connecting waveguides and simple butt coupling but are optically connected to the semiconductor lasers by a planar micro-lens.

The invention is described in greater detail by way of example in the following specification with reference to Figures.

DESCRIPTION OF THE PREFERRED EMBODIMENTS

In the embodiments of the inventive transmission module shown in the Figures, the housing is generally referenced 1, the cavity tightly surrounded by the housing 1 is referenced 10, the semiconductor lasers arranged in the cavity 10 are referenced 2, each of the optical connecting waveguides secured hermetically tight in the housing 1 is referenced 3, each of the optical fibers leading away from the housing 1 is referenced 4, and each of the electrical connecting lines secured hermetically tight in the housing 1 is referenced 5.

Each connecting waveguide 3 secured hermetically tight in the housing 1 produces a hermetically tight, optical connection between the cavity 10 and the outside environment 100 of the housing 1, and connects a light exit window 21 of a respective semiconductor laser 2 and an end face 41 of a respective fiber 4 to one another optically.

The optical connection between each semiconductor laser 2 and the connecting waveguide 3 allocated to it is realized by butt coupling, i.e. an end face 31 of the connecting waveguide 3 lies directly opposite the light exit window 21 of this semiconductor laser 2.

The optical connection between each connecting waveguide 3 and the optical fiber 4 allocated to it is realized by butt coupling in the same way, the end face 41 of this fiber 4 lies directly opposite an end face 32 of this connecting waveguide 3.

What is critical given this basic structure of an inventive transmission module is that the connecting waveguides 3 secured or sealed hermetically tight in the housing 1 are a fixed component part of the housing 1, so that the fibers 4 need not be soldered into the housing, but can be connected to the housing 1 at the outside. The semiconductor lasers 2 and connecting waveguides 3 are protected in the housing 1.

The hermetically tight, electrical connecting lines 5 connecting the cavity 10 and the outside environment 100 of the housing 1 to one another are connected in the cavity 10 to the semiconductor lasers 2 and, potentially, to electrical circuits required therefor and located in the cavity 10, and, outside the housing 1, to electrical terminals and/or leads.

In the embodiments of the inventive module shown in FIGS. 1 through 4 and corresponding to a first structuring concept, the housing 1 is composed of a first housing section 11 and of a second housing section 12.

The first housing section 11 comprises a recess 101 in the fashion of a blind hole that defines the cavity 10, at least all semiconductor lasers 2 being arranged therein, and all electrical connecting lines 5 are secured hermetically tight in this housing section 11, these connecting the cavity 10 and the outside environment 100 of the housing 1 to one another.

All connecting waveguides 3 are secured and sealed hermetically tight in the second housing section 12.

The first and second housing section 11 and 12 are to be adjusted relative to one another and connected hermetically tight to one another such that the recess 101 in the fashion of a blind hole is enclosed hermetically tight between the two housing sections 11 and 12, whereby it forms the cavity 10 of the housing, and such that each semiconductor laser 2 is optically connected by a respective connecting waveguide 3 to a respective fiber 4.

The first and the second housing section 11 or, respectively, 12 are preferably fashioned as follows for the hermetically tight connection of the housing sections 11 and 12 to one another:

The first housing section 11 comprises an essentially planar surface region 110 that contains an opening $101_1$ of the recess 101 in the fashion of a blind hole.

The second housing section 12 comprises an essentially planar surface region 120 at which end faces 31 of all connecting waveguides 3 are located and exhibit essentially the same orientation 125 as this surface region 120.

The surface region 110 and 120 of the two housing sections 11 and 12 are to be arranged lying opposite one another such and are to be adjusted relative to one another such for finishing the hermetically tightly closed housing 1 that the surface region 120 of the second housing section 12 covers the opening $101_1$ of the blind-hole recess 101 in the surface region 110 of the first housing section 11 and the end face 31 of each connecting waveguide 3 is located in the region of the opening $101_1$ and the end face 31 of a respective connecting waveguide 3 lies opposite the light exit window 21 of each semiconductor laser 2; in this condition, the two housing sections 11 and 12 are to be connected to one another hermetically tight.

The first housing section 11 is preferably and advantageously fashioned such that it is composed of a first housing part $11_1$ having an essentially planar, first surface section 111 and an essentially planar, second surface section $110_1$ residing at an angle relative to the first surface section 111, and a second housing part $11_2$ having an essentially planar, first surface section 112 and an essentially planar, second surface section $110_2$ residing at an angle relative to this first surface section 112.

All semiconductor lasers 2 and all electrical connecting lines 5 are secured on the first surface section 111 of the first housing part $11_1$. The second housing part $11_2$ comprises a recess 102 defining the blind-hole recess 101 of the first housing section 11, both the first as well as the second surface section 112, $110_2$ of the second housing part $11_2$ adjoining this recess 102.

The two housing parts $11_1$ and $11_2$ have the first surface sections 111 and 112 lying opposite one another joined hermetically tight to one another such that all electrical connecting lines 5 are enclosed hermetically tightly between the first surface sections 111 and 112, the second surface sections $110_1$, $110_2$ essentially align and together form the essentially planar surface region 110 of the first housing section 11, and at least all semiconductor lasers 2 are arranged in the region of the recess 102 fashioned in the second housing part $11_2$.

Similarly, the second housing section 12 is preferably and advantageously composed of a first surface part $12_1$ having an essentially planar first surface section 121 and an essentially planar, second housing section $120_1$ residing at an angle relative to the first surface section 121, and a second housing part $12_2$ having an essentially planar, first surface section 122 and an essentially planar, second surface section $120_2$ residing at an angle relative to this first surface section 122.

All connecting waveguides 3 are secured on the first surface section 121 of the first housing part $12_1$.

These two housing parts $12_1$ and $12_2$ are to have the first surface sections 121 and 122 lying opposite one another connected hermetically tightly to one another such that all optical connecting waveguides 3 are enclosed hermetically tightly between these first surface sections 121, 122, and the second sections or regions $120_1$ and $120_2$ of these two housing parts $12_1$ and $12_2$ essentially align and in common form the planar surface region 120 of the second housing section 12.

The angle between the first surface section 111 and second surface section $110_1$ of the first housing part $11_1$ and the angle between the first surface section 112 and second surface section $110_2$ of the second housing part $11_2$ of the first housing section 11 are preferably respectively selected as 90°. The same is true of the angle between the first surface section 121 and second surface section $120_1$ of the first housing part $12_1$ and the angle between the first surface section 122 and second surface section $120_2$ of the second housing part $12_2$ of the second housing section 12.

The housing parts $11_1$, $11_2$, $12_1$ and $12_2$ of the two housing sections 11 and 12 are respectively preferably composed of silicon and can be structured by privileged etching and sawing. In the case of the housing parts $11_1$, and $11_2$ of the first housing section 11, however, other materials, for example ceramics, can likewise be employed. A ceramic can also be fashioned as a multi-layer ceramic that already contains the hermetically tightly enclosed electrical connecting lines 5 that are connected to electrical terminals at least of the semiconductor lasers 2 usually fashioned in the form of a laser line.

The first housing part $11_1$ of the first housing 11 comprises a metallization for soldering on the semiconductor lasers 2, for example in the form of the laser line, required bond pads and electrical leads, including the hermetically tight, electrical connecting lines 5.

The semiconductor lasers 2 are preferably soldered onto the first surface section 111 of the first housing part $11_1$ such that the light exit window 21 of each semiconductor laser 2 is only a few $\mu$m, typically 5 $\mu$m removed from the second surface section $110_1$ of the first housing part $11_1$ residing at the angle relative to the first surface section 111, so that a good butt coupling of the semiconductor laser 2 to the connecting waveguide 3 of the second housing section 12 allocated to this laser 2 is achieved.

The connection of the individual lasers 2 to electrical leads can, given junction-down mounting, ensue by flip chip bonding.

The second housing part $11_2$ of the first housing section 11 serves as cover for the first housing part $11_1$ thereof and is hermetically tightly connected to the latter, for example by soldering, to which and suitable metallizations and/or solder layers are to be applied onto these housing parts $11_1$, and $11_2$. When joining the housing parts $11_1$ and $11_2$, it should be assured, for example with a correspondingly suitable device that their second surface sections $110_1$ and $110_2$ aligned with one another so that a hermetically tight connection of the housing sections 11 and 12 is subsequently possible.

The first housing part $12_1$ of the second housing section 12 contains the connecting waveguides 3 of, for example, doped glass. The connecting waveguides 3 can be manufactured integrate with known deposition methods and in planar technology, preferably on a substrate of silicon. They can be manufactured in the form of a waveguide line corresponding to semiconductor lasers 2 arranged in a semiconductor line.

Alternatively thereto, optical fiber sections as connecting waveguides 3 can also be placed into corresponding grooves that are produced in the first housing part $12_1$ of the second housing section 12. When joining the two housing parts $12_1$ and $12_2$ of the second housing section 12, they then must be soldered hermetically tight or glazed.

Further possibilities represented by the employment of connecting waveguides 3 that are generated integrated in glass by ion exchange. To that end, of course, a suitable glass material must be employed for the first housing part $12_1$ of the second housing section 12.

The second housing part $12_2$ of the second housing section 12 serves as cover for the first housing part $12_1$ of this section 12 and is connected hermetically tightly to this first housing part $12_1$, for example by soldering.

After a potential processing of the surface regions 110 and 120 of the two housing sections 11 and 12 and/or an anti-blooming of the second housing section 12 that covers at least the region of the end faces 31 of the connecting waveguides 3 facing toward the semiconductor lasers 2 but can also cover the region of the end faces 32 of the connecting waveguides 3 facing toward the optical fibers 4, the first and second housing section 11 and 12 are adjusted relative to one another, for example by an active adjustment of the second housing section 12 relative to the first housing section 11, and the two housing parts 11 and 12 are joined hermetically tightly to one another, for example again by soldering, whereby suitable metallizations and/or solder layers are to be provided at the housing sections 11 and 12.

In order to facilitate the joining of the two housing parts $11_1$ and $11_2$ of the first housing section 11 or, respectively, of the two housing parts $12_1$ and $12_2$ of the second housing section 12 as well, pyramid-shaped holes privileged etched, for example in the case of housing parts of silicon, can be etched into the housing parts, and balls respectively fitting into one of the two housing parts can be placed therein or glued therein, these assuring an extremely precise adjustment of the two housing parts to be joined relative to one another.

Each optical fiber 4 is preferably held at the housing 1, preferably such given the housing 1 composed of the two housing sections 11 and 12 that an end section containing the end face 41 is arranged and secured in a fiber guide channel 44 fashioned in the second housing section 12 so that this end face 41 lies immediately opposite the end face 32 of the connecting waveguide 3 facing toward it and to which this fiber 4 is allocated.

At the second housing section 12 composed of the two housing parts $12_1$ and $12_2$, each fiber guidance channel 44 is preferably fashioned in a sub-surface $121_1$ or, respectively, $122_1$ adjoining the connecting waveguide 3 in the planar surface section 121 or, respectively, 122 of at least one of the two housing parts $12_1$ and $12_2$ of the second housing section 12.

Figure 1:
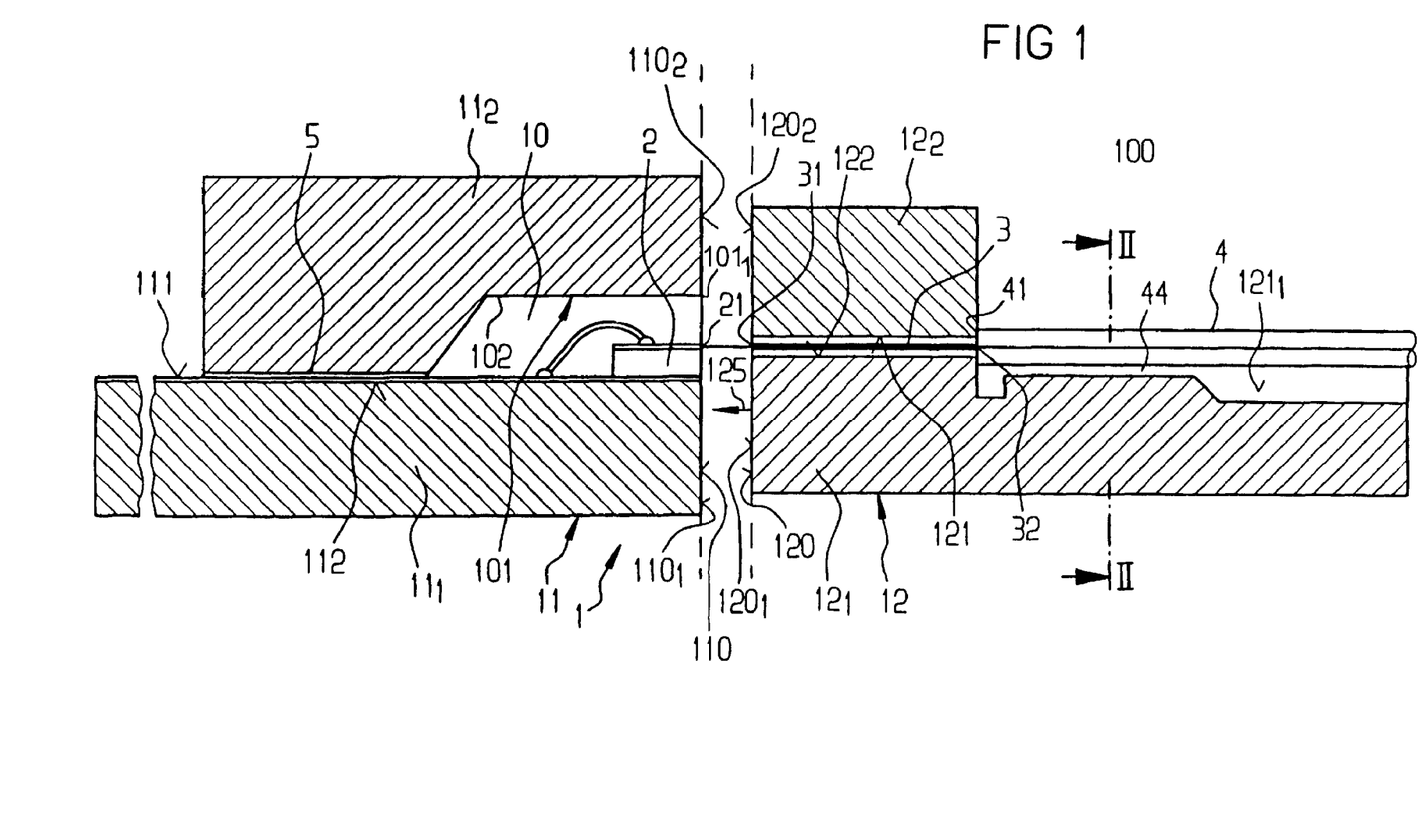
FIG. 1 is a vertical longitudinal section through an embodiment of an inventive transmission module, whereby the housing is composed of two housing sections that are shown in their condition of still being separated from one another.
Figure 2:
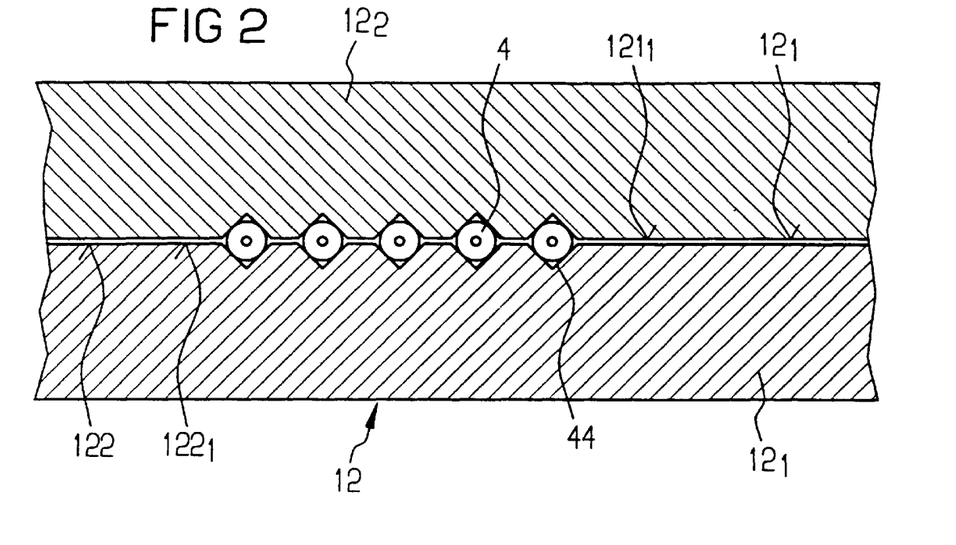
FIG. 2 is a cross-section through the second housing section of the embodiment according to FIG. 1 along the section line II—II.

Given the embodiment of FIGS. 1 and 2, it is specifically established such that each is fashioned in the fiber guidance channel 44 in sub-surfaces $121_1$ and $122_2$ lying opposite one another in the planar surface regions 121 and 122 of both housing parts $12_1$ and $12_2$ of the second housing section 12.

FIG. 2, for example, shows five fiber guidance channels 44 in cross-section, each thereof containing one of five optical fibers 4, preferably glass fibers. The channels 44 proceed parallel to one another. The number of channels 44 as well as the number of fibers 4 and of semiconductor lasers 2 is not limited to five but can be lower and largely arbitrarily higher. In the example of FIG. 2, each channel 44 is specifically composed of two grooves having a respectively V-shaped cross-section, the one thereof being fashioned in the one sub-surface 121, and the other being fashioned in the other sub-surface 122, that proceed in longitudinal direction perpendicular to the plane of the drawing of this FIG. 2, i.e. proceed parallel to one another, and that have their long sides lying opposite one another.

Figure 3:
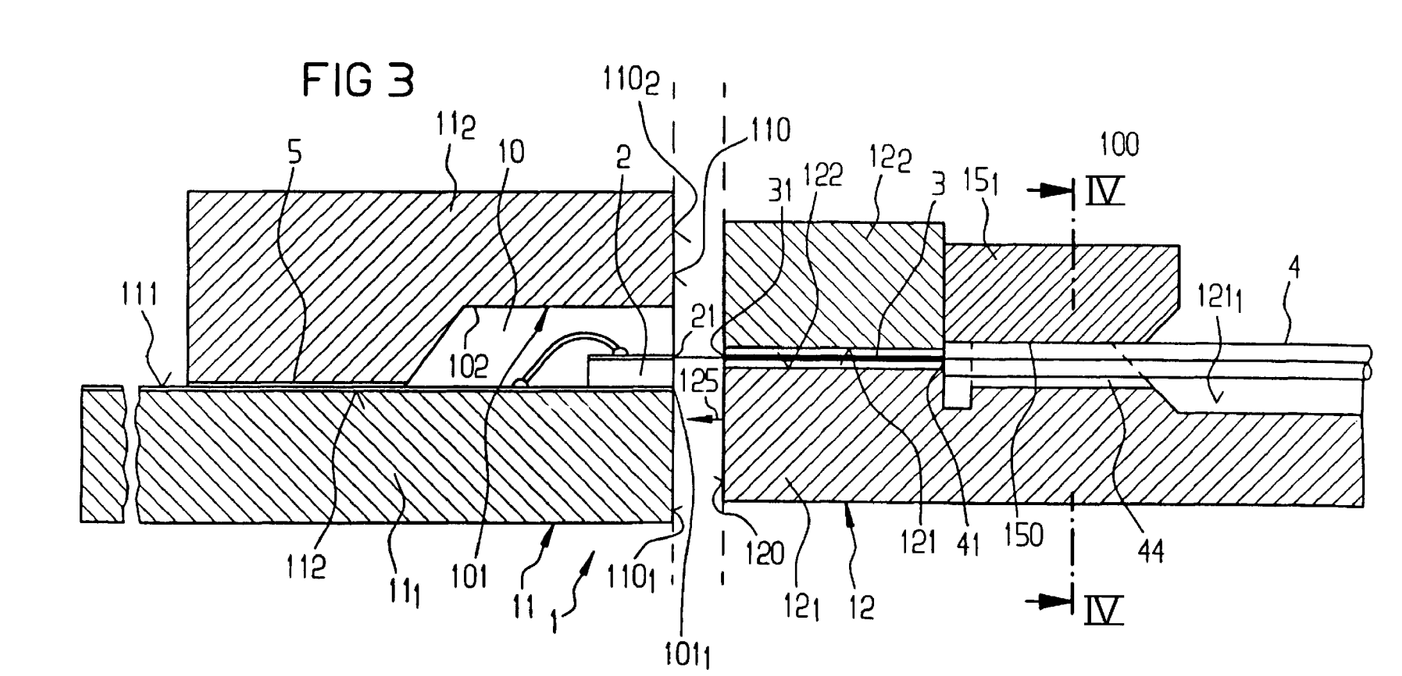
FIG. 3 is a modification of the embodiment of FIG. 1 in the same illustration.
Figure 4:
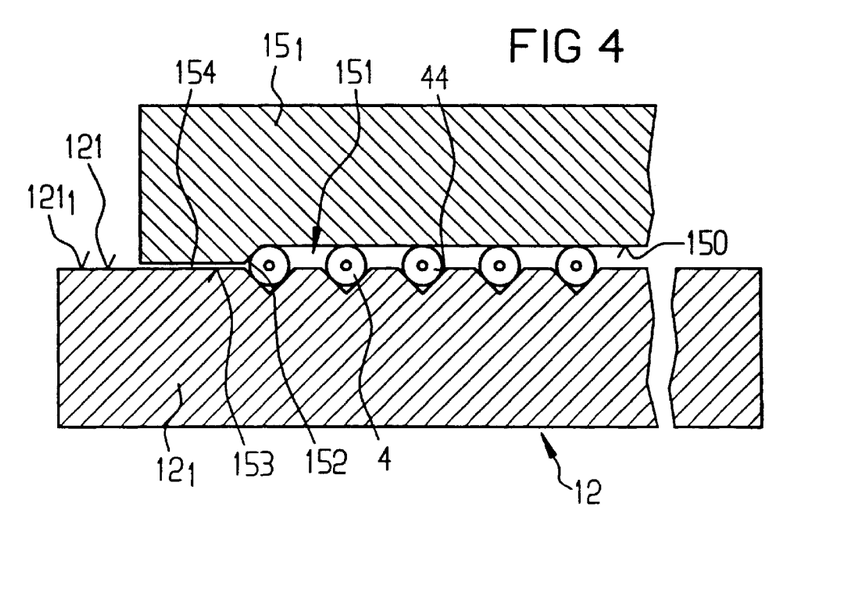
FIG. 4 is a partial cross-section through the second housing section of the modified embodiment according to FIG. 3 along the section line IV—IV.

Given the modified embodiment to the first structuring concept shown in FIGS. 3 and 4, it has been established such that the sub-surface of the surface region containing a fiber guidance channel 44 of only one of the two housing parts $12_1$ and $122$ of the second housing section 12, the sub-surface $121_1$ of the surface region 121 of the first housing part $12_1$ of the second housing section 12 in the illustrated case, is free of the other, the second housing part $12_2$ of this housing section 12.

FIG. 4 shows such guide channels 44 in cross-section. Each of these channels 44 is composed of a groove with V-shaped cross-section fashioned in the sub-surface $121_1$. The grooves 44 proceed in longitudinal direction perpendicular to the plane of the drawing of FIG. 4, i.e. parallel to one another.

The end section of a respective fiber 4 containing the end face 32 is accepted in each groove 44 and secured, for example with adhesive.

Given the embodiment of FIGS. 3 and 4, the fibers 4 arranged in the groove-shaped fiber guidance channels 44 are specifically covered by a separate part $15_1$ in the form of a block of, for example, glass that comprises a planar surface 150 facing toward the sub-surface $121_1$ that lies against the circumferential surface of the fibers 4. The fibers 4 can be pressed into the open, groove-shaped fiber guidance channels 44 with the part 15, and can be fixed by glueing.

In order to keep a glued gap small, the planar surface 150 of the separate part $15_1$ as shown in FIG. 4, can be the bottom surface of a recess 151 fashioned in the part $15_1$ that is laterally limited by a step 152. A glue layer in a glue gap between a surface section 153 of the block 15.1 offset from the floor surface 150 of the recess by the step 152 and the surface region 121 of the first housing section 12 is referenced 154.

Alternatively thereto, the groove-shaped fiber guidance channels 44 in the appertaining sub-surface $121_1$ or $122_1$ can be implemented so deep that the fibers 4 have their circumferential surface projecting only a few micrometers from this sub-surface $121_1$ or $122_1$.

So that, in this case, the connecting waveguides 3 can align with the more deeply placed fibers 4, the connecting waveguides 3 must be produced on a surface of the appertaining housing part $12_1$ or $12_2$ of the second housing section 12 lying deeper relative to the sub-surface $121_1$ or $122_1$. Given a housing part $12_1$ or $12_2$ of silicon, this more deeply disposed surface can be produced, for example, by etching deeper before the application of the waveguide layers for the connecting waveguides 3 in the region thereof.

With the fiber guidance channels 44, the fibers 4 to be coupled to the connecting waveguides 3 can be positioned exactly with reference to these waveguides 3 such that an end face 41 of each fiber 4 lies exactly opposite an end face 32 of a respective connecting waveguide 3. The same is true given guide channels in which connecting waveguides 3 are to be arranged in the form of, for example, glass segments.

Grooves forming fiber guidance channels 44 can be manufactured by privileged etching and/or with a "free cut".

Figure 5:
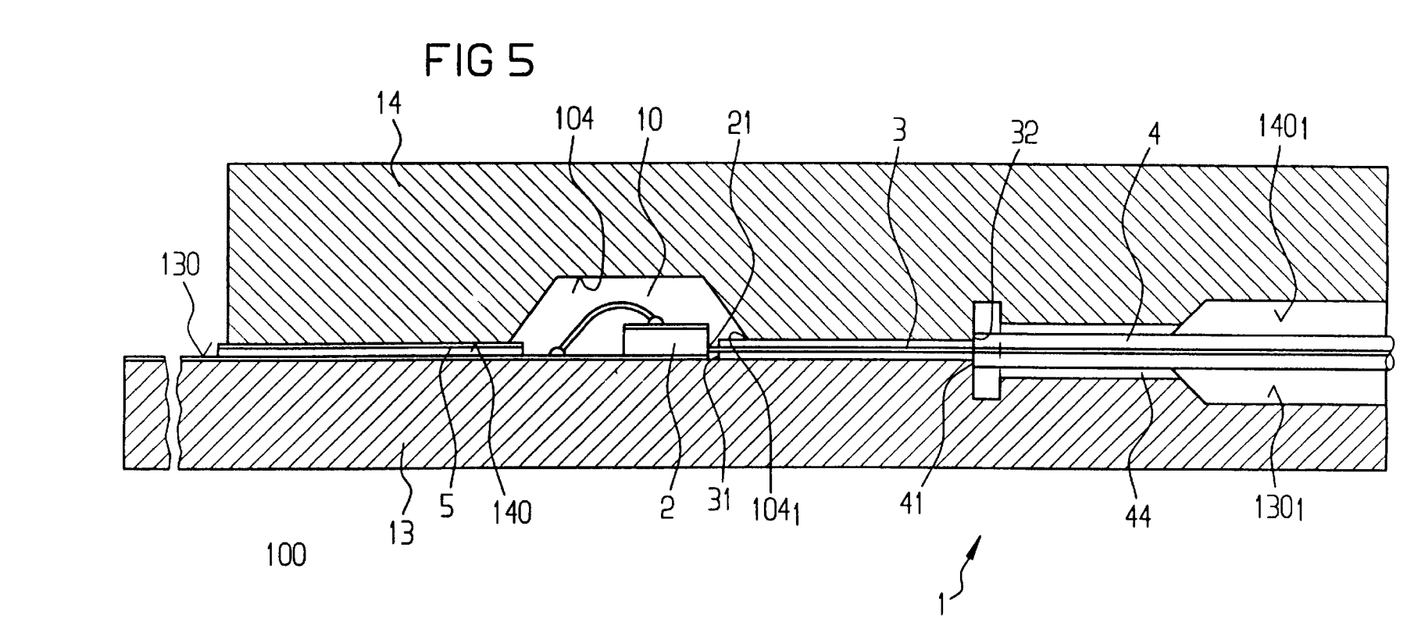
FIG. 5 is a vertical longitudinal section through another embodiment of the inventive transmission module having different housing sections than in the embodiments according to FIGS. 1 through 4.
Figure 6:
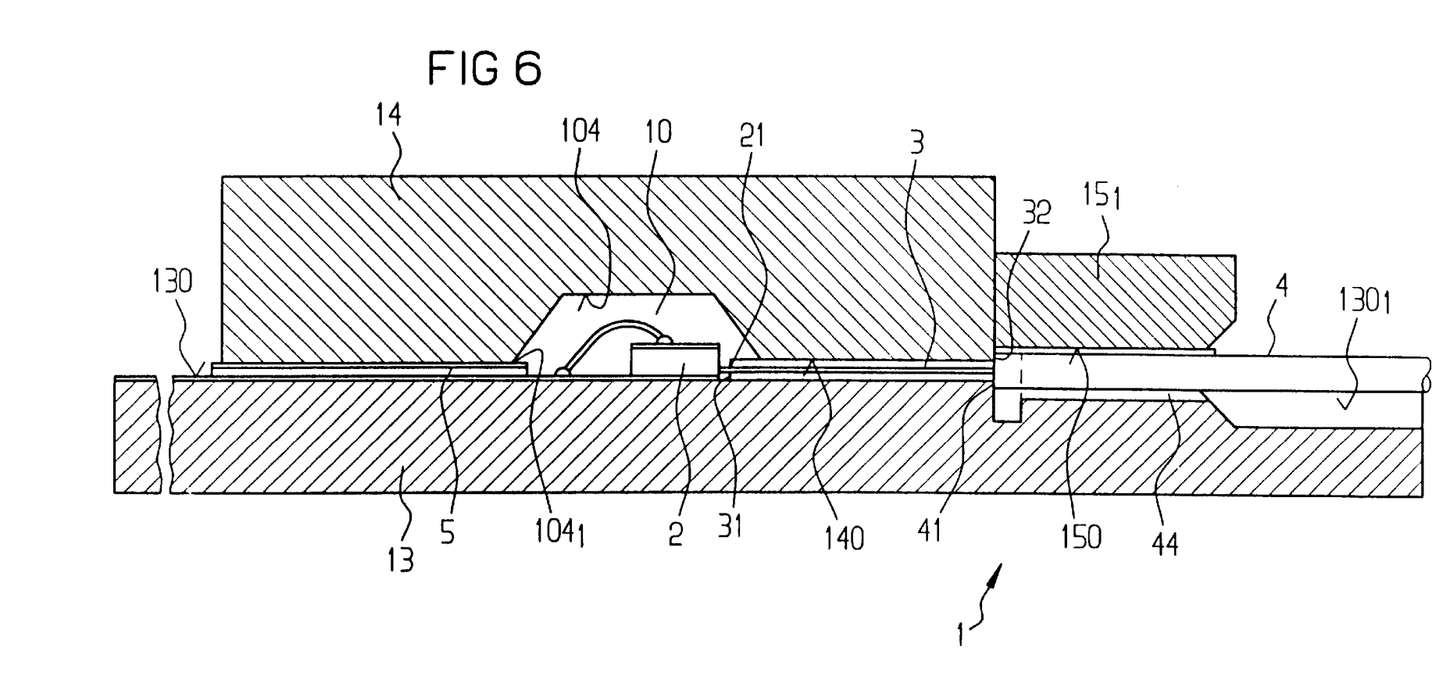
FIG. 6 is a modification of the embodiment according to FIG. 5 in the same illustration.

Given the embodiments of the inventive module illustrated in FIGS. 5 and 6 and corresponding to a second structuring concept, the housing 1 is composed of a first housing section 13 and of a second housing section 14.

Differing from the first structuring concept, at least all semiconductor lasers 2, connecting waveguides 3 and electrical connecting lines 5 are secured on the first housing section 13, such that an end face 31 of a respective connecting waveguide 3 lies opposite the light exit window 21 of every semiconductor laser 2, and the second housing section 14 comprises a blind-hole recess 104 that defines the cavity 10 of the housing 1.

The first and second housing sections 13 and 14 are to be connected hermetically tightly to one another adjusted such relative to one another that at least all semiconductor lasers 2 are arranged in the region of the blind-hole recess 104, and this recess 104, the connecting waveguides 3 and the electrical connecting lines 5 are enclosed hermetically tightly between the two housing sections 13 and 14, whereby the enclosed recess 104 forms the cavity 10 of the housing 1.

For the hermetically tight or seal of the housing sections 13 and 14 to one another, the first and the second housing section 13 or, respectively, 14 are preferably fashioned as follows:

The first housing section 13 comprises an essentially planar surface region 130 on which at least all semiconductor lasers 2, connecting waveguides and electrical connecting lines 5 are secured that an end face 31 of the respective connecting waveguide 3 lies opposite the light exit window 21 of each semiconductor laser 2.

The second housing section 14 comprises an essentially planar surface region 140 that contains an opening $104_1$ of the blind-hole recess 104 fashioned in this second housing section 14.

The two housing sections 13 and 14 are to be connected hermetically tightly to one another adjusted such relative to one another that the two surface regions 130 and 140 lie opposite one another, the surface region 140 of the second housing section 14 covers the opening 104₁ in the surface region 130 of the second housing section 14, all semiconductor lasers 2 are arranged in the region of this opening 104₁, the blind-hole recess 104 is enclosed hermetically tightly between the two housing sections 13 and 14 and forms the cavity 10 of the housing 1, and all connecting waveguides 3 and electrical connecting lines 5 are enclosed hermetically tightly between the surface regions 130 and 140 of the two housing sections 13 and 14.

So that the semiconductor lasers 2 and connecting waveguides 3 can be arranged and secured in common on the one housing section 13 given this second structuring concept, it is necessary that the semiconductor lasers are arranged junction down and the light-guiding cores of the connecting waveguides 3 are brought to the level of the light exit windows 21 of the semiconductor lasers 2 on the basis of a corresponding layer structure.

It is also necessary to see to it that the end faces 31 of the connecting waveguides 3 facing toward the light exit windows 21 of the semiconductor lasers 2 are optimally perpendicular to the surface region 130 of the first housing section 13 composed, for example, of silicon. Given connecting waveguides 3 of glass, this can be achieved, for example, by etching the end faces 31 with a suitable dry etching process. As the sole adjustment step, the semiconductor lasers 2 must be aligned relative to the connecting waveguides. Since the semiconductor lasers 2 are often present in the form of a laser line, this line is to be adjusted as a whole relative to the connecting waveguides 3, these being potentially present in all cases in the form of a planar line of waveguides 3 proceed side-by-side. The hermetic tightness is in turn achieved by soldering the two housing sections 13 and 14.

In the second structuring concept, too, a fiber 4 is arranged and secured in a fiber guidance channel 44 fashioned at a sub-surface 130₁ or, respectively, 140₁ adjoining all connecting waveguides 3 in the surface region 130 or, respectively, 140 of the first 13 and/or second housing section 14.

The arrangement and fastening of the fibers 4 can ensue as in the embodiment according to FIGS. 1 and 2 of the first structuring concept, whereby the sub-surface 121₁ therein corresponds here to the sub-surface 130₁ and the sub-surface 122₁ therein corresponds here to the sub-surface 140₁; as in the embodiment of FIGS. 3 and 4 of the first structuring concept, however, it can also ensue with the assistance of the separate part 15₁, so that the sub-surface of the surface region containing a fiber guidance channel 44 of only one of the two housing sections, for example the sub-surface of the surface region 130. As shown in FIG. 6 only the housing section 13, free of the other housing section 14, has a fiber 4 arranged in this fiber guidance channel 44 which is covered by the separate part 15₁.

Otherwise, that already set forth with respect thereto in the description of the exemplary embodiments according to FIGS. 1 through 4 regarding the fiber guidance channels 44, their arrangement and fashioning and the arrangement and fastening of the fibers 4 also applies in the same way given the exemplary embodiments according to FIGS. 5 and 6.

Advantageously, the second structuring concept is especially assembly-friendly. Advantageously and differing from the first structuring concept, moreover, an active adjustment of the two housing sections 11 and 12 is required in three degrees of freedom. In the first structuring concept, the two housing parts 11 and 12 are to be adjusted in two lateral directions and at an angle relative to one another. Compared to the first structuring concept, the second structuring concept makes higher demands of the trueness of dimension of glass layer thicknesses and of the etching technique for the glass layers.

Technological steps for the second structuring concept are described by way of example below. The manufacturing steps thereby described for the connecting waveguides 3 in the form of glass waveguides are likewise suitable for the first structuring concept.

First, the connecting waveguides 3 in the form of glass waveguide lines are applied onto the surface of a monocrystalline (100)-Si wafer since high-temperature steps are thereby usually involved. To that end, a relatively high viscosity, lower cladding layer of, for example, $SiO_2$—$B_2O_3$ glass is deposited on the surface of the wafer, for example as disclosed in H. W. Schneider, "Realization of $SiO_2$—$B_2O_3$—$TiO_2$ waveguides and reflectors on Si Substrates", edited by M. M. Broer, Th. Kersten, G. H. Sigel and H. Kawazoe, Materials Research Society Symposium Proceedings, Vol. 244, pages 337 through 342. This is followed by a core glass layer of, for example, $SiO_2$—$B_2O_3$—$GeO_2$—$TiO_2$ with an increased refractive index relative to the adjoining layers for the purpose of the light guidance. The definition of the waveguide structures then ensues by suitable photolithographic steps upon employment of lacquer masks or of hard masks as well (for example, a-Si, Ti or Cr) and by RIE etching in, for example, $CHF_3$/argon atmosphere (see said document by Schneider). The cladding glass layer following the core glass layer, for example likewise composed of $SiO_2$—$B_2O_3$—$GeO_2$—$P_2O_5$ glass, should, in addition to its optical function, simultaneously serve for planarization and, thus, enable a good interlock with the second housing section 14 to be placed on as cover for the surface of the wafer forming the first housing section 13. The required lowering of the viscosity is achieved by increased proportion of the dopants $B_2O_3$ or $P_2O_5$. For improving the chemical mechanical surface and contact properties, it is necessary to apply an additional, thin cover layer with reduced dopant proportion. This represents merely one of several manufacturing methods for glass waveguides.

The following, second structuring step serves for definition of laser and fiber grooves as well as of the end faces 31, 32 of the connecting waveguides 3. To that end, the glass layer that is now 40 µm thick, for example, is eroded large-area down to the surface of the wafer. This can ensue either with a cost-beneficial wet-chemical etching step, for example with a $NH_4F$-HF etching mixture, or by reactive ion etching (RIE), similar to the definition step for the connecting waveguides 3. In the former instance, the preparation of the end faces 31, 32 of the connecting waveguides 3 ensues with two saw cuts that are placed such that they limit the connecting waveguides 3 at both sides but do not open the edges of the laser mounting trench. In the latter instance, the RIE etching is implemented such that vertical, smooth end faces of adequate optical quality are formed.

In a third structuring step, the grooves or, respectively, recesses for the fibers 4 and a potential laser positioning are now produced. To that end, the wafer is provided, for example, with a silicon nitride protective layer that is opened at the corresponding positions with a $SF_6$ dry etching step. The shaping of grooves defining the fiber guidance channels 44 for the fibers 4 then ensues by anisotropic wet etching, for example with KOH.

The mounting of the cover in the form of the second housing section 14 of silicon can ensue, for example by soldering or bonding suitable metal layers. To that end, the corresponding $SiO_2$ or Si surfaces of the wafer and of the Si cover are provided with a suitable metallization layer, for example Ti/Pt/Au, Ti/Pt/Au/Sn or Cr/Pt/Au, Cr/Pt/Au/Sn etc., and are subsequently either soldered or connected by a tempering process under pressing power.

In order to achieve good RF properties of the interconnects for the drive of the laser diodes, the silicon that is employed should be high-impedance, for example 2.5 k ohm cm, and a dielectric buffer layer, for example 1 $\mu$m $SiO_2$, should be provided for electrical insulation of the interconnects with respect to the housing sections 13 and 14 of silicon (see, for example, A. Ambrosy, H. Richter, J. Hehmann and D. Ferling, "Silicon Motherboards for Multichannel Optical Modules", Proc. Of 45th ECTC, Las Vegas, May 1995).

The advantages of the inventive transmission module, particularly in the realization in the two described structuring concepts are:

great adjustment tolerances due to the butt coupling, low reactance ($\leq$-30 dB) of the end faces 31, 32 of the connecting waveguides 3 due to the low coupling efficiency ($\leq$-8 dB), simple possibility of processing these end faces 31, 32 (oblique grinding also possible), as well as their anti-blooming, possibility of mounting the laser line junction up or down, precision of the planar technology or, respectively, of the Si privileged etching technique (connecting waveguides 3 in the form of glass waveguides, grooves for optical fibers 4 or plug centering), implementation with fiber pigtails or fiber plugs is possible, adaptation of different grid dimensions of the laser line and fiber line possible on the basis of curved waveguides, suitability for monomode and multimode fibers 4—however, preferably upon interposition of monomode connecting waveguides 4—i.e. coupling efficiency $\leq$-8 dB, given exclusive employment of Si for the housing sections 10, 11, 13, 14, matched coefficients of thermal expansion and, thus, high thermal stability, extremely compact structure, full wafer or, respectively, batch planar processes in the manufacture of the housing sections 11, 12 and 13, 14.

We claim:

1. An optical transmission module composed of a carrier body, at least one semiconductor laser arranged on the carrier body, an optical fiber leading away from the carrier body for each semiconductor laser, and a respective hermetically tight, optical connection formed on the carrier body for each semiconductor laser between the semiconductor laser and an optical fiber, the improvement comprising the carrier body being composed of a housing that hermetically tightly surrounds a cavity in which each semiconductor laser is arranged; each hermetically tight, optical connection between a semiconductor laser and an optical fiber being composed of an optical connecting waveguide secured hermetically tight in the housing for producing an optical connection between the cavity and the outside environment of the housing, and optically connecting a light exit window of the semiconductor laser and an end face of the fiber to one another; and the housing comprises at least one electrical connecting line secured hermetically tight in the housing for producing an electrical connection between the cavity and the outside environment of the housing; the housing comprising a first housing section that comprises a blind-hole recess defining the cavity in which each semiconductor laser is arranged and in which all electrical connecting lines are secured heretically tight; and a second housing section in which all connecting waveguides are secured hermetically tight; the first housing section having an essentially planar surface region that contains an opening of the blind-hole recess; and the second housing section having an essentially planar surface region at which end faces of all connecting waveguides are located and exhibit essentially the same orientation as this surface region; and the surface region of the two housing sections being arranged lying opposite one another and being connected hermetically tightly to one another so that the surface region of the second housing section covers the opening of the blind-hole recess in the surface region of the first housing section to form the cavity, and the end face of each connecting waveguide lies opposite the light exit window of a respective semiconductor laser in the region of the opening to optically connect the laser to a fiber.

2. A module according to claim 1, wherein the first housing section is composed of a first housing part having an essentially planar, first surface section and an essentially planar second surface section residing at an angle relative to the first surface section, and a second housing part having an essentially planar, first surface section and an essentially planar, second surface section residing at an angle relative to this first surface section, so that each semiconductor laser and all electrical connecting lines are secured on the first surface section of the first housing part and the second housing part comprises a recess defining the recess of the first housing section, at which both the first as well as second surface sections of the second housing part are adjacent; and wherein the two housing parts have the first surface section lying opposite one another and are connected hermetically tightly to one another so that all electrical connecting lines are enclosed hermetically tightly between the first surface sections, the second surface sections essentially align and together form the planar surface region of the first housing section, and each semiconductor laser is arranged in the region of the recess formed in the second housing part.

3. A module according to claim 1, wherein the second housing section is composed of a first housing part having an essentially planar, first surface section and an essentially planar, second surface section residing at the angle relative to the first surface section, and a second housing part having an essentially planar, first surface section and an essentially planar, second surface section residing at the angle relative to this first surface section, all connecting waveguides are secured on the first surface section of the first housing part; and wherein the two housing parts have the first surface sections lying opposite one another and are connected hermetically tightly to one another so that all optical connecting waveguides are enclosed hermetically tightly between the first surface sections, and the second surface sections of these two housing parts essentially align and together form the essentially planar surface region of the second housing section.

4. A module according to claim 3, wherein a fiber guidance channel is fashioned in a sub-surface adjoining the connecting waveguides in the surface section of at least one of the two housing parts of the second housing section.

5. A module according to claim 4, wherein the sub-surface of the surface region containing a fiber guidance channel of only one of the two housing parts of the second housing section is free of the other housing part of this housing section; and wherein a fiber arranged in this fiber guidance channel is covered by a separate part.

6. A module according to claim 1, wherein a fiber is arranged and secured in a fiber guidance channel fashioned in the second housing section.

7. A module according to claim 1, wherein each connecting waveguide is composed of glass.

8. A module according to claim 7, wherein each connecting waveguide is composed of a waveguide generated by ionic exchange in glass.

9. A module according to claim 1, wherein each connecting waveguide is composed of an integrated waveguide.

10. A module according to claim 9, wherein the connecting waveguide is composed of a waveguide produced in planar technology on the surface of a substrate.

11. A module according to claim 1, wherein the fiber is held at the housing.

12. An optical transmission module composed of a carrier body, at least one semiconductor laser arranged on the carrier body, an optical fiber leading away from the carrier body for each semiconductor laser, and a respective hermetically tight, optical connection formed on the carrier body for each semiconductor laser between the semiconductor laser and an optical fiber, the improvement comprising the carrier body being composed of a housing that hermetically tightly surrounds a cavity in which each semiconductor laser is arranged; each hermetically tight, optical connection between a semiconductor laser and an optical fiber being composed of an optical connecting waveguide secured hermetically tight in the housing for producing an optical connection between the cavity and the outside environment of the housing, and optically connecting a light exit window of the semiconductor laser and an end face of the fiber to one another; and the housing comprises at least one electrical connecting line secured hermetically tight in the housing for producing an electrical connection between the cavity and the outside environment of the housing, the housing comprising a first housing section on which each semiconductor laser connecting waveguide and electrical connecting lines are secured so that an end face of a respective connecting waveguide lies opposite the light exit window of each semiconductor laser, and a second housing section having a blind-hole recess defining the cavity; and the first and second housing sections being hermetically tightly connected to one another and adjusted relative to one another so that all semiconductor lasers are arranged in the region of the blind-hole recess and said recess, the connecting waveguides and the electrical connecting lines being enclosed hermetically tightly between the two housing sections, so that the enclosed recess forms the cavity of the housing.

13. A module according to claim 12, wherein the first housing section comprises an essentially planar surface region on which each semiconductor laser, each connecting waveguide and each electrical connecting line are secured so that an end face of the respective connecting waveguide lies opposite the light exit window of each semiconductor laser; the second housing section having an essentially planar surface region that contains an opening of the blind-hole recess fashioned in the second housing section; and wherein the two housing sections are hermetically tightly connected to one another and adjusted relative to one another so that the two surface regions lie opposite one another with the surface region of the second housing section covering the opening in the surface region of the second housing section, all semiconductor lasers are arranged in the region of this opening, the blind-hole recess is enclosed hermetically tightly between the two housing sections and forms the cavity of the housing, and all connecting waveguides and electrical connecting lines are enclosed hermetically tightly between the surface regions of the two housing sections.

14. A module according to claim 12, wherein a fiber is arranged and secured in a fiber guidance channel fashioned in a sub-surface of the surface region of one of the first and second housing sections adjoining all connecting waveguides.

15. A module according to claim 14, wherein the sub-surface containing a fiber guidance channel in the surface region of only one of the two housing sections and is free of the other housing section; and in that a fiber arranged in the fiber guidance channel is covered by a separate part.

16. A module according to claim 12, wherein each connecting waveguide is composed of glass.

17. A module according to claim 16, wherein each connecting waveguide is composed of a waveguide generated by an ionic exchange in glass.

18. A module according to claim 17, wherein each connecting waveguide is composed of an integrated waveguide.

19. A module according to claim 18, wherein the connecting waveguide is composed of a waveguide produced in planar technology on the surface of a substrate.

* * * * *